(12) United States Patent
Kim

(10) Patent No.: US 7,604,285 B1
(45) Date of Patent: Oct. 20, 2009

(54) POST-MOUNTING STRUCTURE OF COWL COMPLETE PANEL WITH IMPROVED DESIGN FREEDOM OF FRONT PILLAR PART

(75) Inventor: Do Hoi Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 12/422,071

(22) Filed: Apr. 10, 2009

(30) Foreign Application Priority Data

Apr. 11, 2008 (KR) .................. 10-2008-0033845

(51) Int. Cl.
*B60J 7/00* (2006.01)
(52) U.S. Cl. .................... 296/192; 296/193.06
(58) Field of Classification Search ............ 296/192, 296/193.06
See application file for complete search history.

(56) References Cited

U.S. PATENT DOCUMENTS 4,917,435 A * 4/1990 Bonnett et al. ......... 296/190.08
5,619,784 A * 4/1997 Nishimoto et al. ............ 29/430

FOREIGN PATENT DOCUMENTS

| JP | 04-244334 A | 9/1992 |
|---|---|---|
| JP | 10-218027 A | 8/1998 |
| JP | 11-198855 A | 7/1999 |
| JP | 11-255147 A | 9/1999 |
| JP | 2002-037123 A | 2/2002 |
| JP | 2005-119542 A | 5/2005 |
| JP | 2007-137367 A | 6/2007 |

* cited by examiner

*Primary Examiner*—Joseph D Pape
(74) *Attorney, Agent, or Firm*—Morgan, Lewis & Bockius LLP

(57) ABSTRACT

A post-mounting structure of a cowl complete panel is provided, which includes a front pillar part having a side outer panel, and a cowl complete having a cowl top panel and a cowl side inner member, wherein a side shape of an outside of the cowl top panel is formed to correspond to a side shape of a compartment side of the side outer panel, and a forward parting line of a rear side of the cowl side inner member is formed ahead of a front parting line of a front side of the side outer panel, to form a specified space between the forward parting line of the rear side of the cowl side inner member and the front parting line of the front side of the side outer panel.

9 Claims, 9 Drawing Sheets

POST-MOUNTING STRUCTURE OF COWL COMPLETE PANEL WITH IMPROVED DESIGN FREEDOM OF FRONT PILLAR PART

CROSS-REFERENCE TO RELATED APPLICATION

The present application claims priority to Korean Patent Application Number 10-2008-0033845, filed on Apr. 11, 2008, the entire contents of which is incorporated herein for all purposes by this reference.

BACKGROUND OF THE INVENTION

1. Field of the Invention

The present invention relates to a post-mounting structure of a cowl complete panel with improved design freedom of a front pillar part, and more particularly, to a post-mounting structure of a cowl complete panel, in which a front pillar part can be freely designed without changing the layout of the existing factory equipment, and thus design freedom of the front pillar part can be enhanced.

2. Description of Prior Art

In general, a car body of a vehicle takes a box shape constructed from a proper combination of various panels and a frame, and the car body produced from such a combination in which the frame and the body are integrally formed is referred to as a monocoque structure.

An assembling sequence of such a monocoque structure is determined according to the layout of production lines of a vehicle manufacturing company. A front part, a center part, a rear part, and a dashboard part are first assembled, and then a side structure part is assembled. Finally, a cowl part is mounted.

The cowl part restrains vibration occurring during the drive of a vehicle, and particularly, twist of a car body occurring at a sharp turn thereof, absorbs impact energy occurring at a collision of the vehicle, and prevents various components in an engine compartment from entering into a compartment of the vehicle due to the impact energy.

FIG. 1 is a plan view illustrating a conventional mounting structure of a cowl complete, and FIG. 2 is a perspective view illustrating the mounting structure of FIG. 1.

As illustrated in FIGS. 1 and 2, according to the conventional mounting structure of the cowl complete, a front parting line A of a side outer panel 12 constituting a front pillar part is formed normal with respect to the front pillar part. That is, the front parting line A is formed along a cowl top panel 22.

Accordingly, in the case of post-mounting the cowl complete 20, no interference occurs between the cowl complete 20 and the side outer panel 12, and thus there is no problem in loading the cowl complete from the upper direction. This structure has been currently used in most vehicle manufacturing equipment, and it is general that factory layout is provided to suit the structure.

However, the conventional mounting structure as described above has the problem that it severely limits the design freedom of the front pillar part. That is, in this case, interference occurs from downward direction between the cowl complete and the side outer panel due to the limited space in front of the cowl top panel 22, and thus it is impossible to post-mount the cowl complete.

Accordingly, in the case of designing the side outer panel as described above, it is required to pre-mount the cowl complete. In order to pre-mount the cowl complete, however, the whole layout of the factory equipment should be changed at a great cost, and thus it is actually impossible to change the design of the side outer panel as described above.

In conclusion, the existing post-mounting structure of the cowl complete has the problem that it limits the design of the side outer panel constituting the front pillar part within specified range.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a post-mounting structure of a cowl complete panel, in which a front pillar part can be freely designed without changing the layout of the existing factory equipment, and thus design freedom of the front pillar part can be heightened.

In an aspect of the present invention, the post-mounting structure of a cowl complete panel with improved design freedom of a front pillar part, may include a front pillar part including a side outer panel, and a cowl complete including a cowl top panel and a cowl side inner member, wherein a side shape of an outside of the cowl top panel is formed to correspond to a side shape of a compartment side of the side outer panel so that the side shape of the outside of the cowl top panel does not interfere with the side shape of the compartment side of the side outer panel in upward and downward directions within a range where post-mounting of the cowl complete is not obstructed, and/or a forward parting line of a rear side of the cowl side inner member is formed ahead of a front parting line of a front side of the side outer panel, to form a specified space between the forward parting line of the rear side of the cowl side inner member and the front parting line of the front side of the side outer panel so that the cowl side inner member does not interfere with the front shape of the side outer panel in upward and downward directions within a range where the post-mounting of the cowl complete is not obstructed so that the post-mounting of the cowl complete becomes possible irrespective of the front parting line of the front pillar part.

The front parting line of the side outer panel may be formed to project ahead of a connection portion of the side outer panel and the cowl top panel.

The front pillar part may further include a side outer reinforcement provided inside the side outer panel, and the cowl complete further includes a cowl inner lower panel provided on a lower side of the cowl top panel to match the side outer reinforcement, wherein a matching surface portion formed between the side outer reinforcement and the cowl inner lower panel is positioned inside an inner parting line of a compartment side of the side outer panel, wherein a rear portion of the cowl side inner member is coupled to the cowl top panel and the cowl inner lower panel.

In another aspect of the present invention, the post-mounting structure may further include a cowl side upper outer bracket configured to correspond to a space formed between the side outer panel and the cowl side inner member and provided in the space.

Since the post-mounting structure of the cowl complete panel according to the present invention further includes the cowl side upper outer bracket, the NVH (Noise, Vibration, and Harshness) performance of the vehicle can be improved, and the combination relation between the panels can be strengthened.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE PREFERRED EMBODIMENTS

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims. Also, well-known functions or constructions or repeated description thereof may be omitted.

Figure 3:
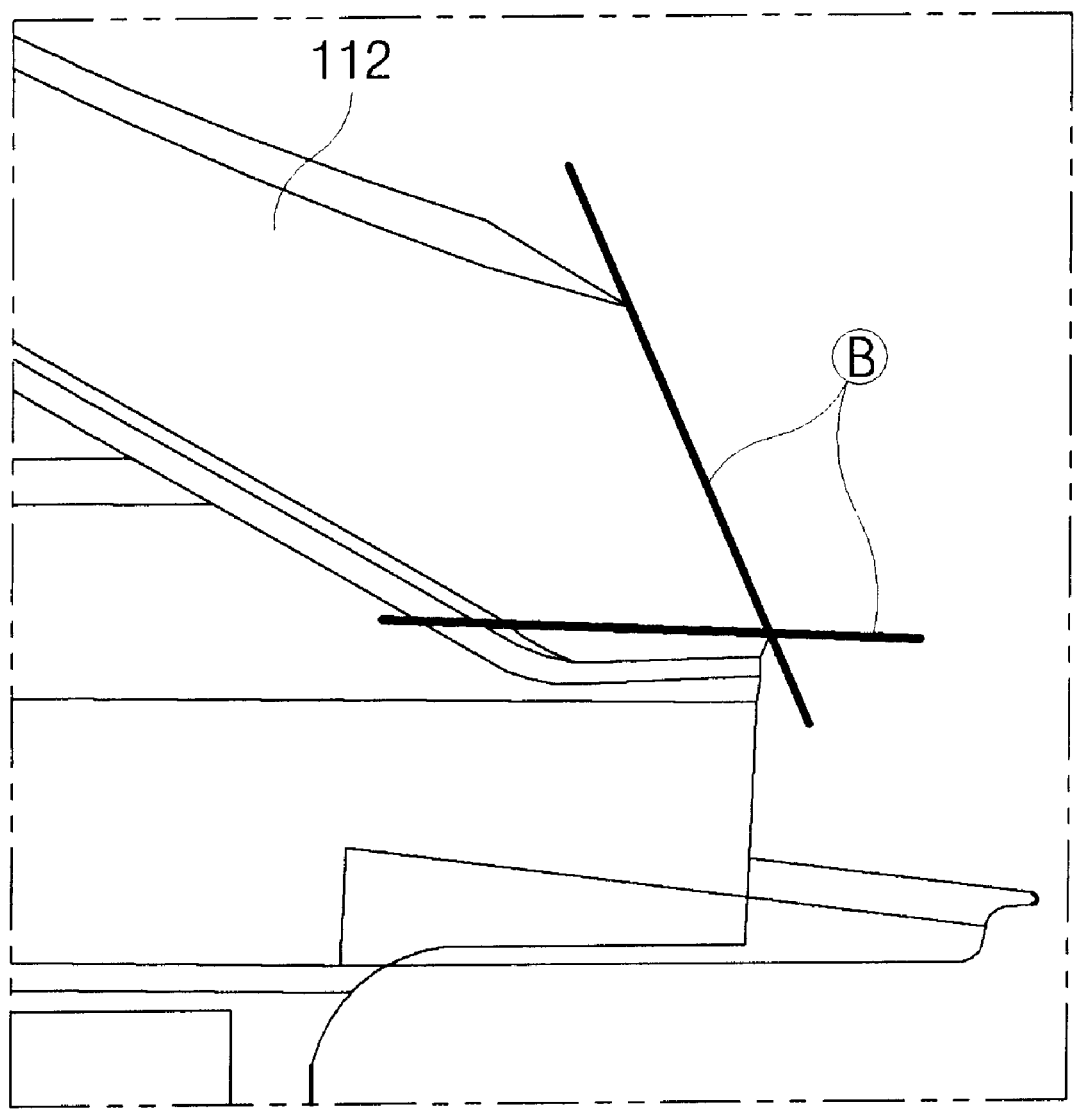
FIG. 3 is a side view illustrating an exemplary side outer panel constituting a front pillar part according to the present invention.
Figure 4:
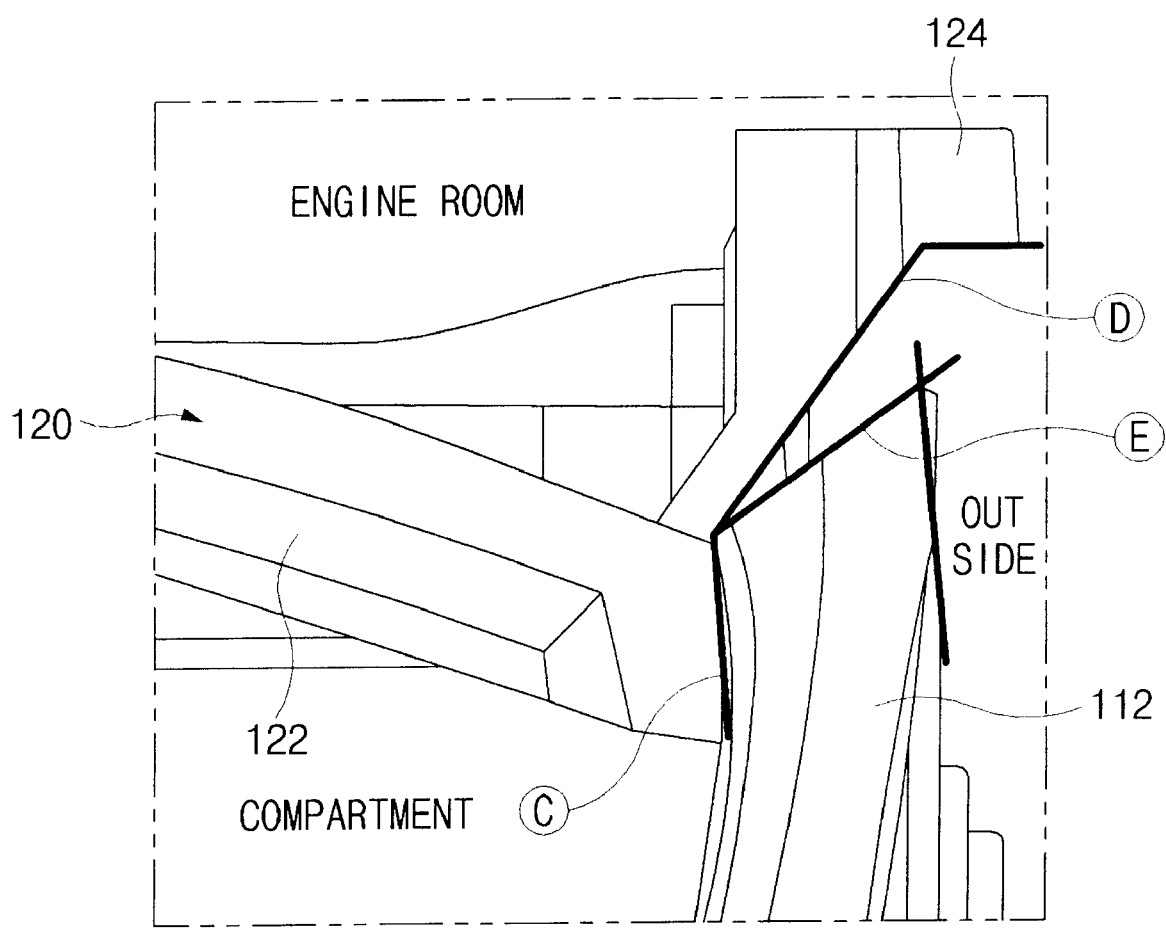
FIG. 4 is a plan view illustrating a cowl complete adopting a side outer panel of FIG. 3.

FIG. 3 is a side view illustrating a side outer panel constituting a front pillar part according to various exemplary embodiments of the present invention. FIG. 4 is a plan view illustrating a cowl complete adopting a side outer panel of FIG. 3, and FIG. 5 is a perspective view illustrating the cowl complete of FIG. 4.

Figure 5:
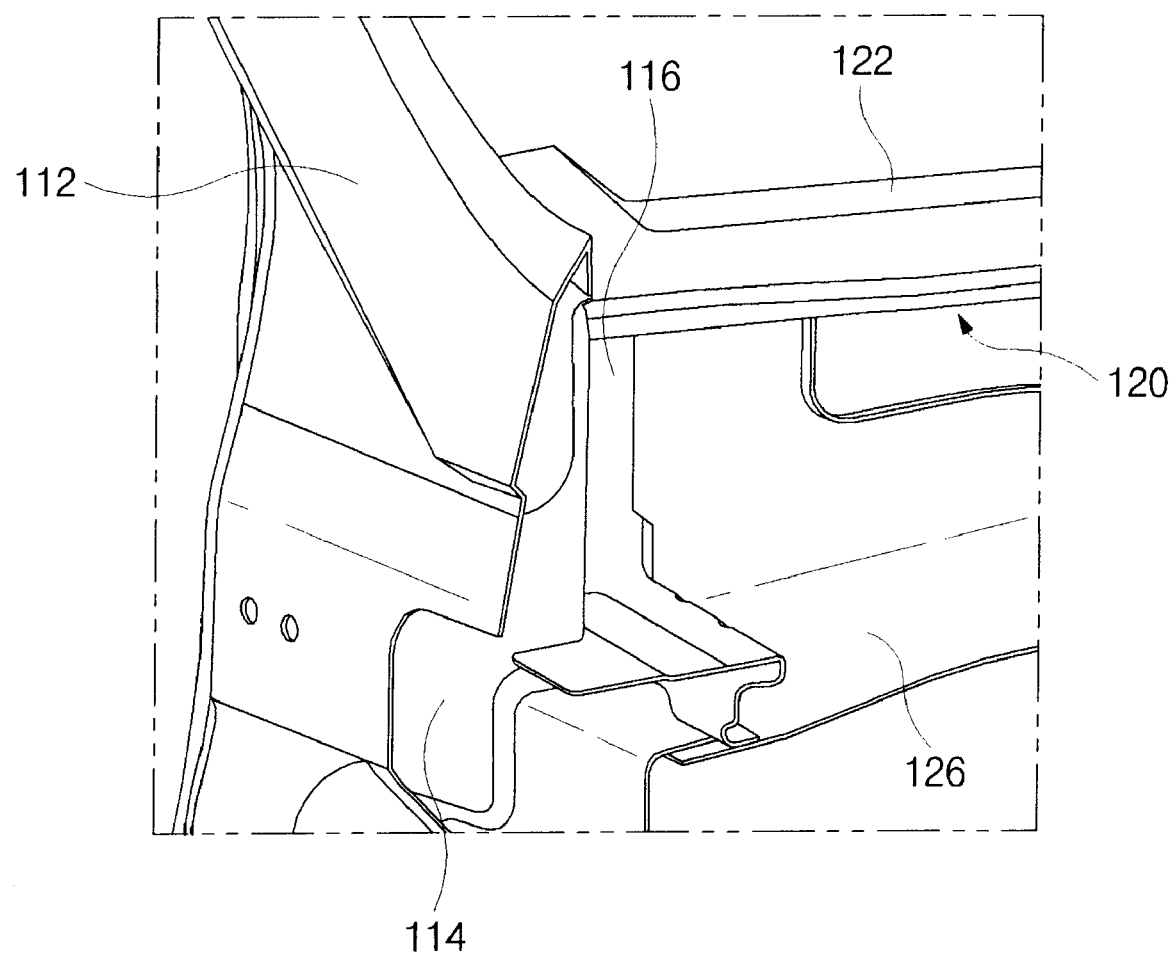
FIG. 5 is a perspective view illustrating the cowl complete of FIG. 4.

As illustrated in FIGS. 3 to 5, a post-mounting structure of a cowl complete panel according to various exemplary embodiments of the present invention includes a front pillar part including a side outer panel 112, and a cowl complete 120 including a cowl top panel 122 and a cowl side inner member 124.

Here, a front parting line E of the side outer panel 112 may be formed to project ahead of a connection portion of the side outer panel 112 and the cowl top panel 122. For example, the parting line B of the side outer panel 112 may be formed to achieve a parting line "E" as seen from the side as illustrated in FIGS. 3 and 4.

On the other hand, as illustrated in FIG. 4, the side shape of the outside of the cowl top panel 122 may be formed to correspond to the side shape of a compartment side of the side outer panel 112 so that the side shape of the outside of the cowl top panel 122 does not interfere with the side shape of the compartment side of the side outer panel 112 in upward and downward directions within a range where post-mounting of the cowl complete 120 is not obstructed. Specifically, the parting line C of the outside of the cowl top panel 122 may be formed to correspond to the side shape of the compartment side of the side outer panel 112.

As the cowl top panel 122 is constructed as described above, the shape of the outside of the cowl complete 120 does not interfere with the shape of the compartment side of the front pillar part even if the cowl complete 120 is loaded after the front pillar part and so on is mounted, and thus the post-mounting of the cowl complete 120 is not obstructed by the shape of the compartment side of the front pillar part.

In addition, as illustrated in FIG. 5, the front pillar part may further include a side outer reinforcement 114 provided inside the side outer panel 112, and the cowl complete 120 may further include a cowl inner lower panel 126 provided on the lower side of the cowl top panel 122 to match the side outer reinforcement 114.

Here, the side outer reinforcement 114 may be provided with a first combination surface portion extending to the compartment side, and the cowl inner lower panel 126 may be provided with a second combination surface portion extending to the outside to match the first combination surface portion. Accordingly, the side outer reinforcement 114 and the cowl inner lower panel 126 can be connected together through the combination surface portion (i.e. matching surface portion) 116.

In various embodiments of the present invention, it is preferable that the matching surface portion 116 is positioned on the compartment side of the vehicle, which is more inside the front parting line E of the side outer panel 112 or the inner parting line C of the outside of the cowl top panel 122. Through the matching surface portion 116, the side outer reinforcement 114 and the cowl inner lower panel 126 are firmly connected together, and the post-mounting of the cowl complete 120 is not obstructed by the matching surface portion 116.

On the other hand, as illustrated in FIG. 4, a forward parting line D disposed in front portion of the cowl side inner member 124 is formed ahead of the parting line E disposed in the front side of the side outer panel 112, so that the rear portion of the cowl side inner member 124 does not interfere with the front shape of the side outer panel 112 in upward and downward directions within the range where the post-mounting of the cowl complete 120 is not obstructed. As the parting lines are formed as described above, a specified space may be formed between the forward parting line D disposed in front portion of the cowl side inner member 124 and the parting line E of the front side of the side outer panel 112.

As the forward parting line D is disposed in front portion of the cowl side inner member 124 as described above, no interference occurs between the cowl side inner member 124 and the front shape of the front pillar part even if the cowl complete 120 is loaded after the front pillar part and so on is mounted, and thus the post-mounting of the cowl complete 120 is not obstructed by the front shape of the front pillar part.

Figure 6:
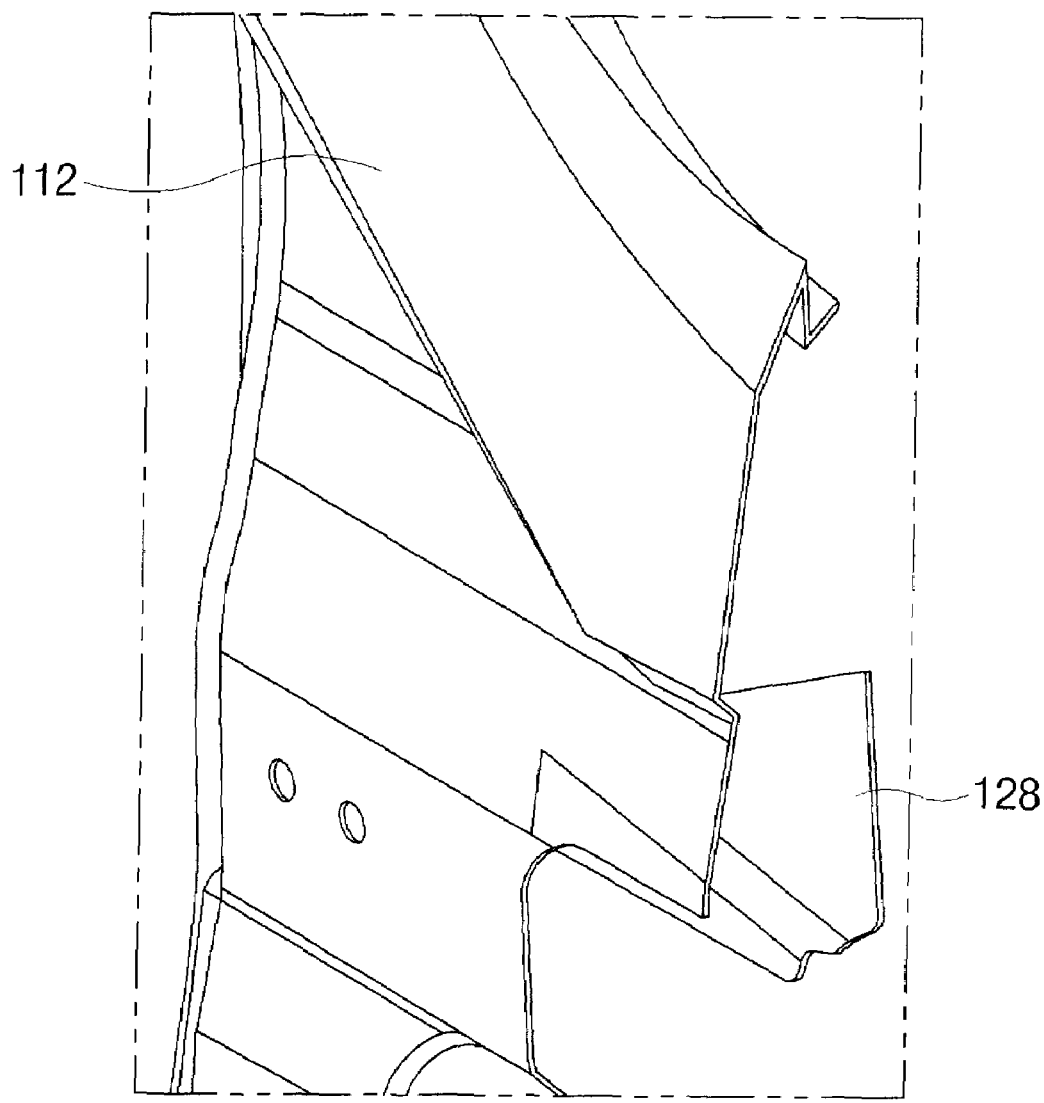
FIG. 6 is a perspective view illustrating an exemplary cowl side upper outer bracket provided in a specified space formed between a parting line of a rear side of a cowl side inner member and a parting line of a front side of a side outer panel according to the present invention.
Figure 7:
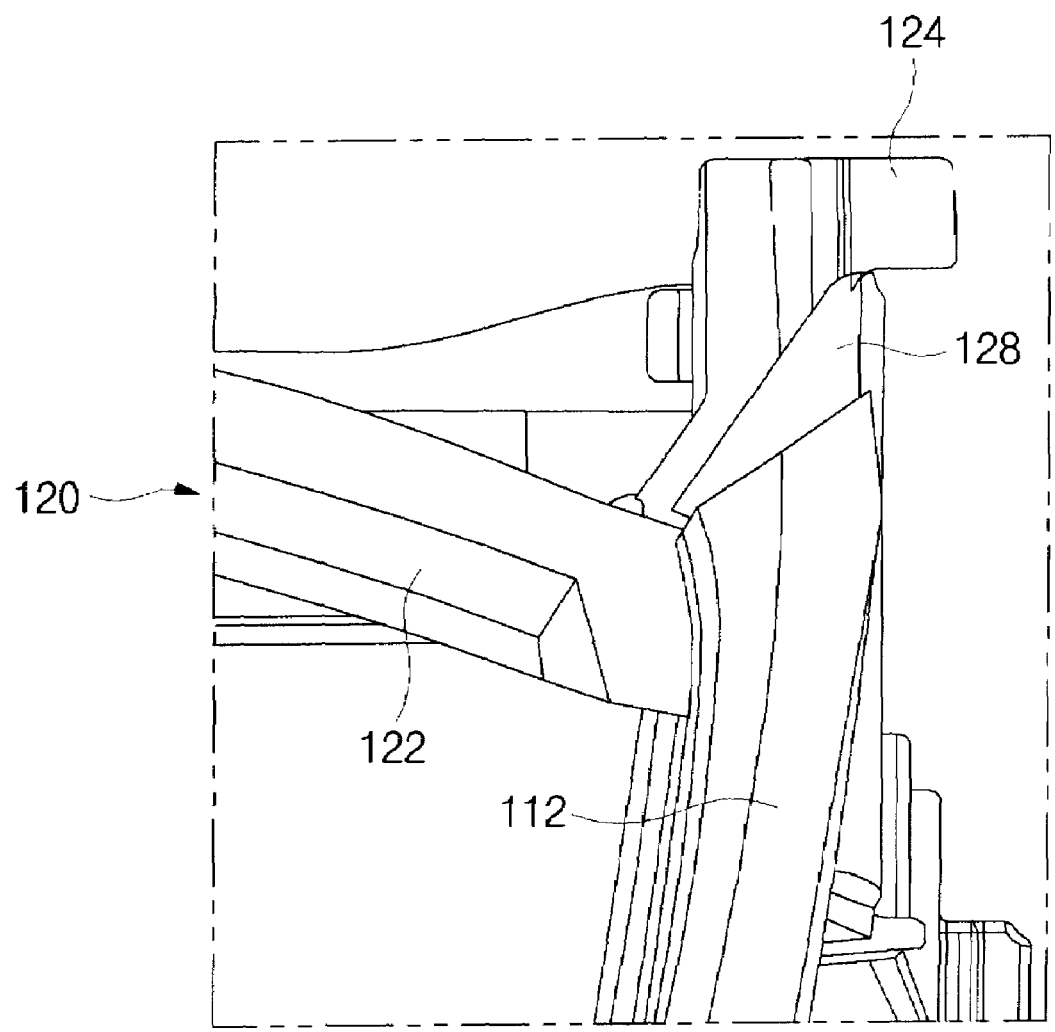
FIG. 7 is a plan view illustrating a structure on which an exemplary cowl side upper outer bracket is mounted according to the present invention.

However, due to the specified space formed between the forward parting line D disposed at the front portion of the cowl side inner member 124 and the parting line E of the front side of the side outer panel 112, wind noise and so on may occur to deteriorate the NVH (Noise, Vibration, and Harshness) performance of the vehicle. On the other hand, FIG. 6 is a perspective view illustrating a cowl side upper outer bracket provided in a specified space formed between the parting line of the front side of the cowl side inner member and the parting line of the front side of the side outer panel according to various embodiments of the present invention, and FIG. 7 is a plan view illustrating a structure on which a cowl side upper outer bracket 128 is mounted according to various embodiments of the present invention.

In order to prevent the performance deterioration as described above, as illustrated in FIGS. 6 and 7, the post-mounting structure of the cowl complete panel according to various embodiments of the present invention may further include the cowl side upper outer bracket 128 formed to correspond to a space formed between the side outer panel 112 and the cowl side inner member 124 and provided in the space. This cowl side upper outer bracket 128 can be pre-assembled before the cowl complete 120 is loaded.

Since the post-mounting structure of the cowl complete panel according to various embodiments of the present invention further includes the cowl side upper outer bracket 128 as described above, the NVH performance of the vehicle can be improved, and the combination relation between the panels can be strengthened.

The post-mounting structure of the cowl complete panel according to various embodiments of the present invention makes it possible to post-mount the cowl complete even without changing the layout of the existing factory equipment irrespective of the parting structure of the front pillar part.

Figure 1:
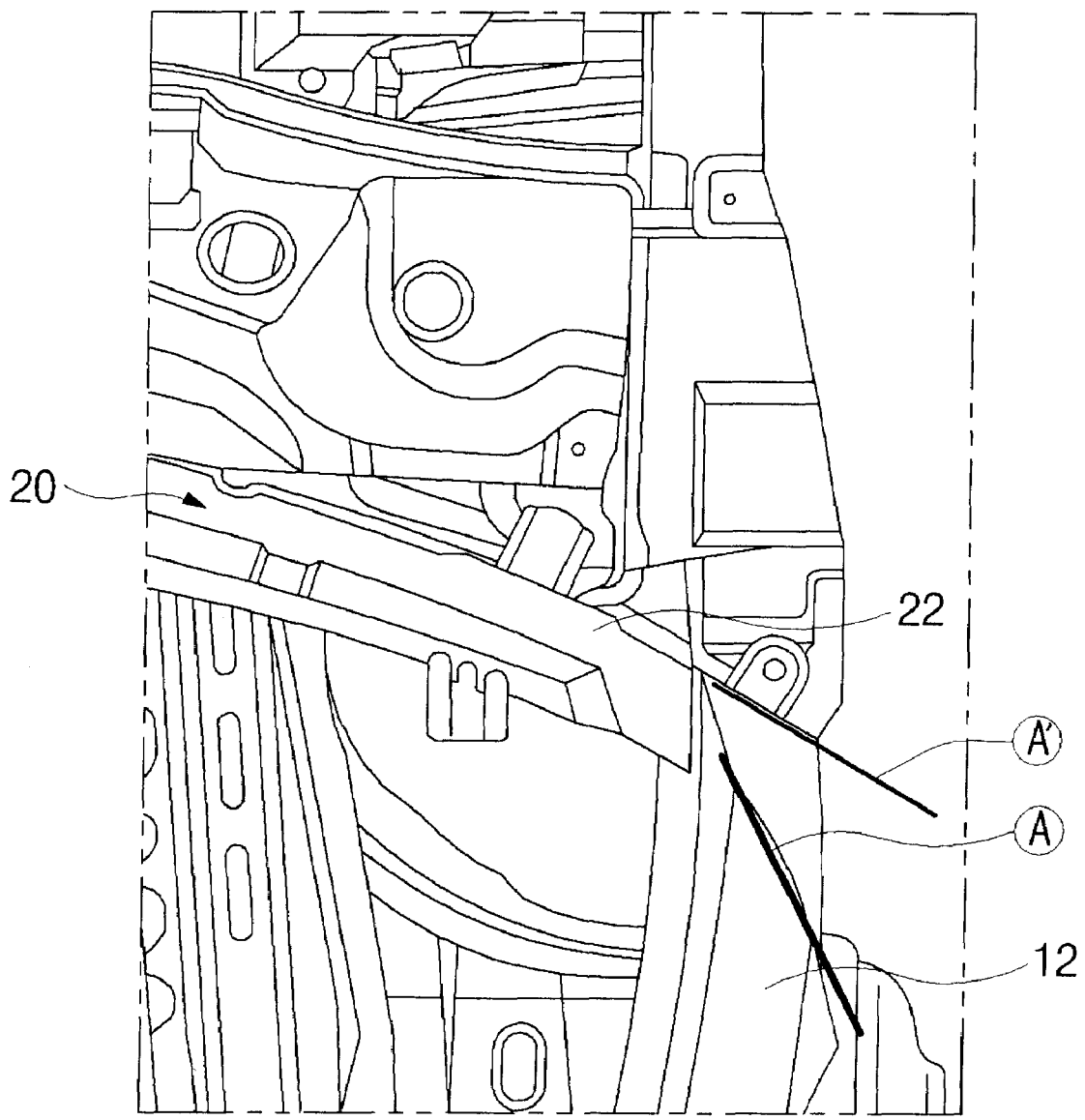
FIG. 1 is a plan view illustrating a conventional mounting structure of a cowl complete.
Figure 2:
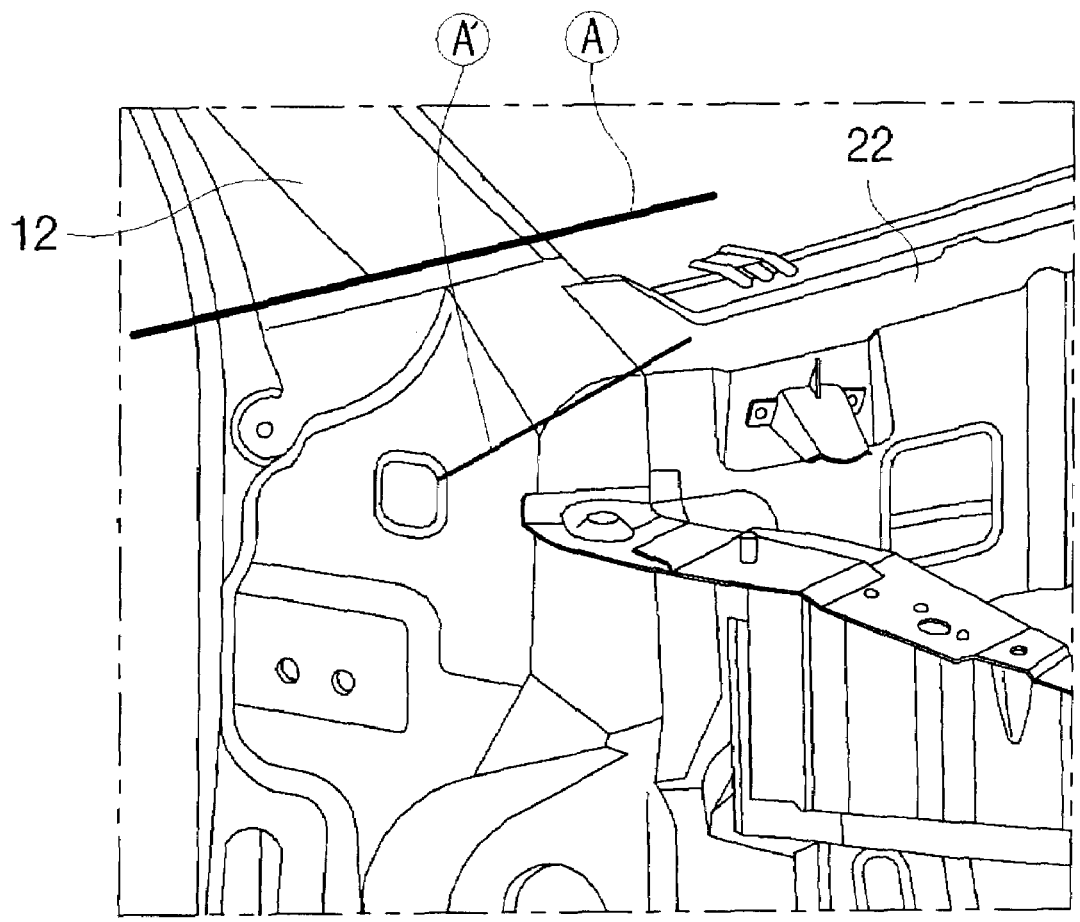
FIG. 2 is a perspective view illustrating the mounting structure of FIG. 1.

By contrast, according to the conventional cowl complete structure as illustrated in FIG. 1, in the case where the parting line of the side outer panel 12 constituting the front pillar part is formed along the connection portion of the side outer panel 12 and the cowl top panel 22, interference occurs from downward directions between the cowl complete 20 and the side outer panel 12, and thus it is impossible to post-mount the cowl complete 20. Accordingly, the conventional post-mounting structure of the cowl complete has the problem that it limits the design of the side outer panel constituting the front pillar part within specified range.

Figure 8:
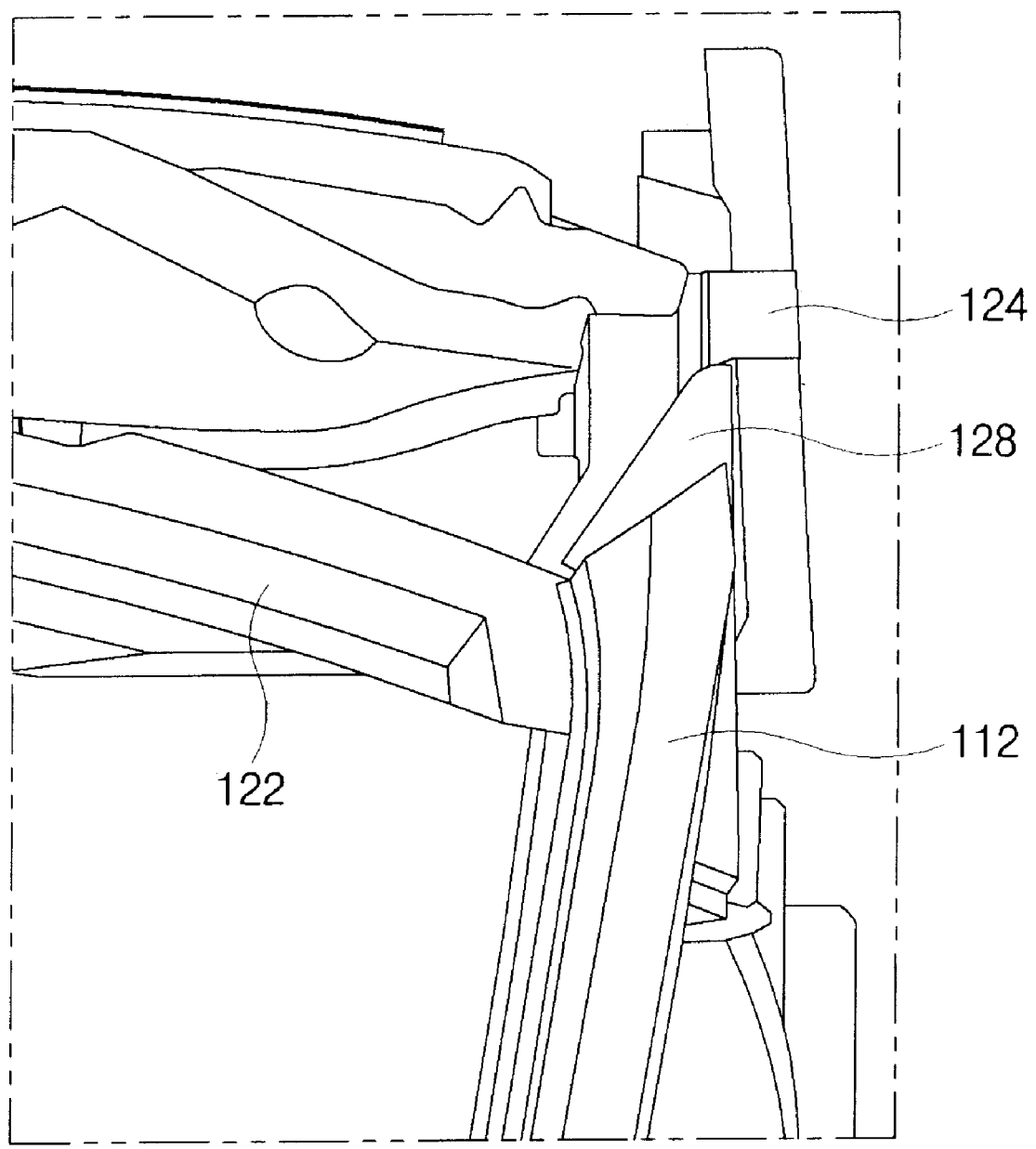
FIG. 8 is a plan view illustrating an exemplary structure on which a cowl complete, a side outer panel, and a cowl side upper outer bracket are mounted according to the present invention.
Figure 9:
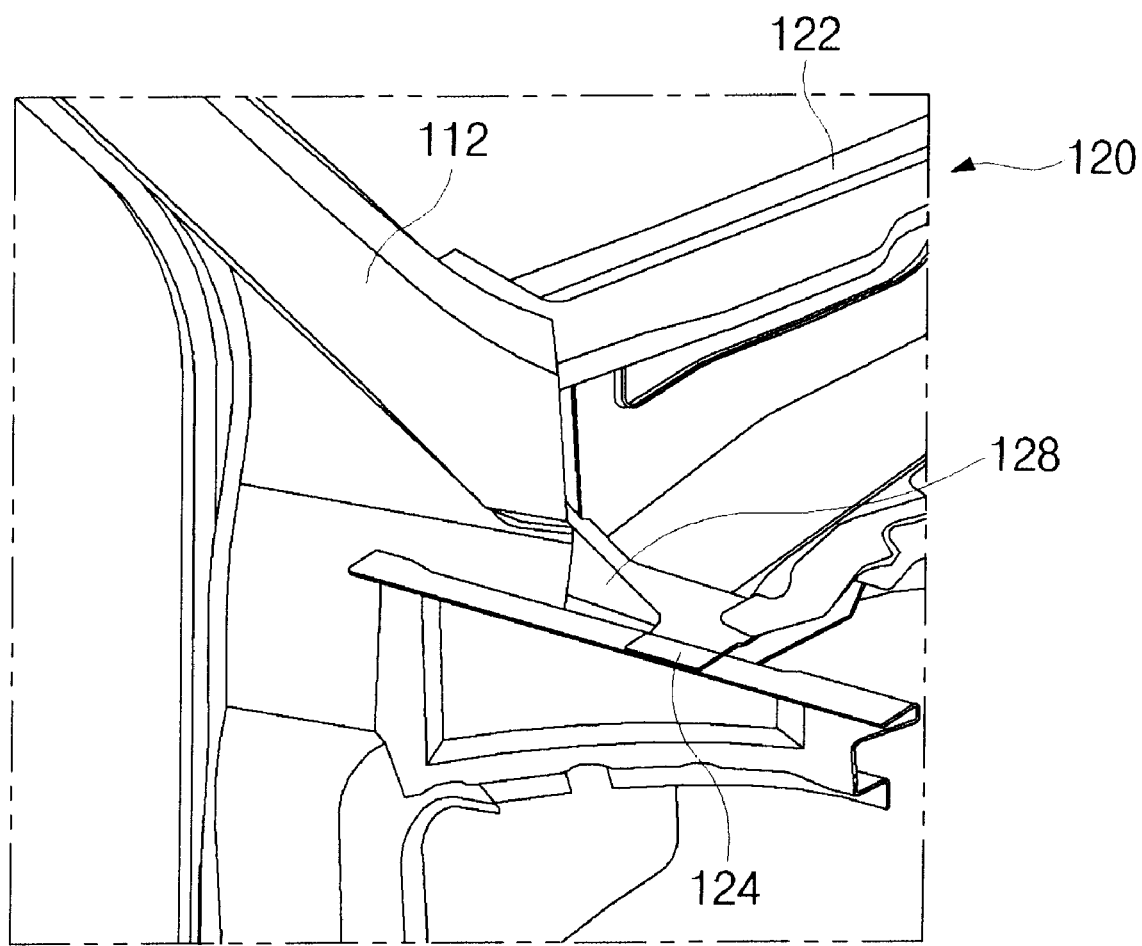
FIG. 9 is a perspective view illustrating the structure of FIG. 8.

However, according to the post-mounting structure of the cowl complete panel according to the present invention as illustrated in FIGS. 8 and 9, since the side shape of the outside of the cowl top panel 122 and the parting line of the rear side of the cowl side inner member 124 are formed so that they do not interfere with components of the front pillar part in upward and downward directions, the cowl complete 120 can be post-mounted irrespective of the parting lines of the front pillar part. Accordingly, the design freedom of the front pillar part can be heightened.

Also, since the post-mounting structure of the cowl complete panel according to the present invention further includes the cowl side upper outer bracket 128, the NVH performance of the vehicle can be improved, and the combination relation between the panels can be strengthened.

For convenience in explanation and accurate definition in the appended claims, the terms "upper", "lower", "front" and "rear" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A post-mounting structure of a cowl complete panel with improved design freedom of a front pillar part, comprising:
    a front pillar part including a side outer panel, and a cowl complete including a cowl top panel and a cowl side inner member;
    wherein a side shape of an outside of the cowl top panel is formed to correspond to a side shape of a compartment side of the side outer panel so that the side shape of the outside of the cowl top panel does not interfere with the side shape of the compartment side of the side outer panel in upward and downward directions within a range where post-mounting of the cowl complete is not obstructed; and
    a forward parting line of a rear side of the cowl side inner member is formed ahead of a front parting line of a front side of the side outer panel, to form a specified space between the forward parting line of the rear side of the cowl side inner member and the front parting line of the front side of the side outer panel so that the cowl side inner member does not interfere with the front shape of the side outer panel in upward and downward directions within a range where the post-mounting of the cowl complete is not obstructed so that the post-mounting of the cowl complete becomes possible irrespective of the front parting line of the front pillar part.

2. The post-mounting structure of claim 1, wherein the front parting line of the side outer panel is formed to project ahead of a connection portion of the side outer panel and the cowl top panel.

3. The post-mounting structure of claim 1, wherein the front pillar part further comprises a side outer reinforcement provided inside the side outer panel, and the cowl complete further comprises a cowl inner lower panel provided on a lower side of the cowl top panel to match the side outer reinforcement.

4. The post-mounting structure of claim 3, wherein a matching surface portion formed between the side outer reinforcement and the cowl inner lower panel is positioned inside an inner parting line of a compartment side of the side outer panel.

5. The post-mounting structure of claim 4, wherein one ends of the front parting line, the forward parting line and the inner parting line are disposed substantially at the same position.

6. The post-mounting structure of claim 5, wherein an angle between the inner parting line and the front parting line is larger than an angle between the inner parting line and the forward parting line.

7. The post-mounting structure of claim 3, wherein a rear portion of the cowl side inner member is coupled to the cowl top panel and the cowl inner lower panel.

8. The post-mounting structure of claim 1, further comprising a cowl side upper outer bracket configured to correspond to a space formed between the side outer panel and the cowl side inner member and provided in the space.

9. A passenger vehicle comprising the post-mounting structure of claim 1.

* * * * *